(12) United States Patent
Brown et al.

(10) Patent No.: US 12,166,898 B2
(45) Date of Patent: Dec. 10, 2024

(54) SYSTEMS AND METHODS FOR USING SIGNED DEVICE INFORMATION TO AUTHENTICATE A USER

(71) Applicant: Cisco Technology, Inc., San Jose, CA (US)

(72) Inventors: Michael Brown, Portland, OR (US); Oliver Robert Stocker, Ann Arbor, MI (US); Jeremy Lee Erickson, Renton, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 379 days.

(21) Appl. No.: 17/456,759

(22) Filed: Nov. 29, 2021

(65) Prior Publication Data

US 2023/0171110 A1 Jun. 1, 2023

(51) Int. Cl.
*H04L 9/32* (2006.01)
*H04L 9/08* (2006.01)
*H04L 9/40* (2022.01)

(52) U.S. Cl.
CPC .......... *H04L 9/3247* (2013.01); *H04L 9/0825* (2013.01); *H04L 63/0236* (2013.01); *H04L 63/0876* (2013.01)

(58) Field of Classification Search
CPC ..... H04L 9/3247; H04L 63/0823; H04L 9/50; H04L 9/3271; H04L 9/14; H04L 9/3263; H04L 63/04; H04L 63/0876; H04L 63/105; H04L 63/08; H04L 63/20; H04L 63/0815; H04L 63/10; H04L 9/3226; H04L 9/3213; H04L 9/3239; H04L 63/0407; H04L 63/104; H04L 63/06; H04L 63/0807; H04L 63/0853; H04L 9/006; H04L 63/0442; H04L 9/3236; H04L 63/061; H04L 63/0861; H04L 9/3228; H04L 63/0428; H04L 63/102; H04L 63/126; H04L 9/30; H04L 9/0861; H04L 63/0281; H04L 63/18; H04L 9/08; H04L 2209/56; H04L 2209/76; H04L 67/12; H04L 2209/34; H04L 67/10; H04L 67/02; H04L 67/34; H04L 67/104
See application file for complete search history.

(56) References Cited

U.S. PATENT DOCUMENTS 10,003,466 B1 * 6/2018 Miller ..................... H04L 69/22
10,686,781 B1 6/2020 Kaditz et al.
(Continued)

FOREIGN PATENT DOCUMENTS

WO 2021041566 A1 3/2021

*Primary Examiner* — Djenane M Bayard
(74) *Attorney, Agent, or Firm* — Baker Botts L.L.P.

(57) ABSTRACT

In one embodiment, a method includes establishing, by an identity agent installed on a device, a connection to a browser installed on the device and generating, by the identity agent, first device information, a public key, and a private key. The method also includes communicating, by the identity agent, the first device information and the public key to an authentication service and receiving, by the identity agent, a unique identifier from the authentication service. The method further includes generating, by the identity agent, a first signature of the first device information and communicating, by the identity agent, the first signature, the first device information, and the unique identifier to the browser.

20 Claims, 5 Drawing Sheets

(56) References Cited

U.S. PATENT DOCUMENTS

| | | | |
|---|---|---|---|
| 2012/0150750 A1* | 6/2012 | Law | H04L 67/02 |
| | | | 705/76 |
| 2012/0173740 A1* | 7/2012 | Shukla | H04L 67/146 |
| | | | 709/227 |
| 2015/0046990 A1 | 2/2015 | Oberheide et al. | |
| 2017/0230357 A1 | 8/2017 | Canfield et al. | |
| 2019/0034923 A1* | 1/2019 | Greco | G06Q 20/389 |
| 2019/0260594 A1* | 8/2019 | Singhal | H04L 63/06 |
| 2019/0305955 A1 | 10/2019 | Verma et al. | |
| 2023/0185616 A1* | 6/2023 | Nakamura | H04L 9/32 |
| | | | 718/104 |

\* cited by examiner

SYSTEMS AND METHODS FOR USING SIGNED DEVICE INFORMATION TO AUTHENTICATE A USER

TECHNICAL FIELD

The present disclosure relates generally to communication networks, and more specifically to systems and methods for using signed device information to authenticate a user.

BACKGROUND

Authentication is the process of an entity proving its identity to another entity. An individual may gain access to a computer system by identifying and authenticating themselves using a login. Logins are used by computers, applications, and websites to prevent unauthorized access to confidential data. Currently, users can log into their devices by using a combination of a username and password. The username uniquely identifies the user using the device and the password is used to authenticate the user to the device. However, passwords can be cumbersome. Easy-to-remember passwords and the repetitive use of the same password may present security issues, and users may forget their passwords.

DESCRIPTION OF EXAMPLE EMBODIMENTS

Overview

According to an embodiment, a device includes one or more processors and one or more computer-readable non-transitory storage media coupled to the one or more processors and including instructions that, when executed by the one or more processors, cause the device to perform operations. The operations include establishing, by an identity agent installed on a device, a connection to a browser installed on the device and generating, by the identity agent, first device information, a public key, and a private key. The method also includes communicating, by the identity agent, the first device information and the public key to an authentication service and receiving, by the identity agent, a unique identifier from the authentication service. The method further includes generating, by the identity agent, a first signature of the first device information and communicating, by the identity agent, the first signature, the first device information, and the unique identifier to the browser.

According to another embodiment, a method includes establishing, by an identity agent installed on a device, a connection to a browser installed on the device and generating, by the identity agent, first device information, a public key, and a private key. The method also includes communicating, by the identity agent, the first device information and the public key to an authentication service and receiving, by the identity agent, a unique identifier from the authentication service. The method further includes generating, by the identity agent, a first signature of the first device information and communicating, by the identity agent, the first signature, the first device information, and the unique identifier to the browser.

According to yet another embodiment, one or more computer-readable non-transitory storage media embody instructions that, when executed by a processor, cause the processor to perform operations. The operations include establishing, by an identity agent installed on a device, a connection to a browser installed on the device and generating, by the identity agent, first device information, a public key, and a private key. The method also includes communicating, by the identity agent, the first device information and the public key to an authentication service and receiving, by the identity agent, a unique identifier from the authentication service. The method further includes generating, by the identity agent, a first signature of the first device information and communicating, by the identity agent, the first signature, the first device information, and the unique identifier to the browser.

In certain embodiments, the operations include receiving, by the identity agent, a request for second device information from the browser, generating, by the identity agent, second device information, generating, by the identity agent, a second signature of the second device information, and/or communicating, by the identity agent, the second signature and the second device information to the browser. The first device information may be the same as or different than the second device information.

In some embodiments, the identity agent communicates the first device information and the public key to an authentication service prior to receiving the unique identifier from the authentication service. In some embodiments, the first device information includes one or more of the following: an International Mobile Equipment Identity (IMEI) number of the device, a latest version of the identity agent installed on the device, a latest version of the browser installed on the device, a latest version of an operating system (OS) installed on the device, and an identification of firewalls installed on the device.

In certain embodiments, the identity agent generates the first signature by signing the first device information with the private key. In some embodiments, the private key and the public key form an asymmetric key pair, and/or the identity agent maintains secrecy of the private key. In certain embodiments, the unique identifier is a globally unique identifier (GUID). The unique identifier may uniquely identify the identity agent.

Technical advantages of certain embodiments of this disclosure may include one or more of the following. Certain systems and methods described herein use an identity agent to authenticate a user, which may prevent the user from frequently re-authenticating each time the user logs into applications. In some embodiments, the identity agent generates an asymmetric public/private key pair, which may ensure the security of the encrypted messages and the identity of the identity agent. In certain embodiments, the identity agent identifies and collects device information, which may provide administrators continuous insight into the health of the device. In some embodiments, the identity agent signs the device information with the private key, which allows the authentication service to verify the identity of the identity agent/device using the public key.

Once the authentication service verifies the device and the signature, the authentication service can check for prior associations with users. If the authentication service has previously identified the access device and authentications have been performed on the access device, then the authentication service will have a record of the access device and previous associations. The authentication service can then see from the record which users have been associated with the access device. If the access device has been associated with the user currently accessing the login prompt, then the authentication service can be confident that this is not a phishing attempt, and the authentication service can send the end user a push notification to grant access.

Certain embodiments of this disclosure improve user experience by eliminating password and secrets fatigue while providing unified access to several applications and services. In certain embodiments, security is strengthened by reducing and/or eliminating password management techniques, which may reduce credential theft and/or impersonation. In some embodiments, the embodiments described herein simplify information technology (IT) operations by reducing and/or eliminating the need to issue, secure, rotate, reset, and/or manage passwords.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for using signed device information to authenticate a user. WebAuthn provides a passwordless authentication solution, but WebAuthn has adoption issues. For example, devices such as laptops may not be equipped with biometric sensors and/or have access to hardware keys. As another example, usability challenges exist around access on multiple devices, such as the need to carry a security key. Currently, passwordless access products exist that allow users to authenticate into web applications using their phones, but they often rely on the use of Quick Response (QR) codes presented on the access machine which are then scanned on the phone to delegate authentication to that device. The issue with the use of QR codes is that QR codes are phishable. An attacker can easily phish a user's device with a QR code that when scanned can log the attacker into the user's desired application.

Second factor phishing can occur when a bad actor has stolen a user's primary credentials (e.g., a username and password) and then attempts to gain access to systems pretending to be the victim. The bad actor is hoping that, even if multi-factor authentication (MFA) is in place, end users will be overly conditioned to accept the second factor. In these cases, the end user may select "accept" on the mobile push notification, which provides the attacker access and effectively bypasses MFA.

Certain embodiments described herein provide roaming passwordless authenticators by building upon mobile push for MFA technology. A push notification may be sent to a user's mobile device, and the user can then perform a biometric authentication on the user's mobile device and approve access to log in. To prevent an attacker from sending a fraudulent authentication notification to the user's mobile device, this disclosure requires the presence of an identity agent on the access device. The login prompt requires the identity agent to exist on the access device. An association between the identity agent and the user's identity in the authentication service is cryptographically verified before the notification can be sent to grant access.

Figure 1:
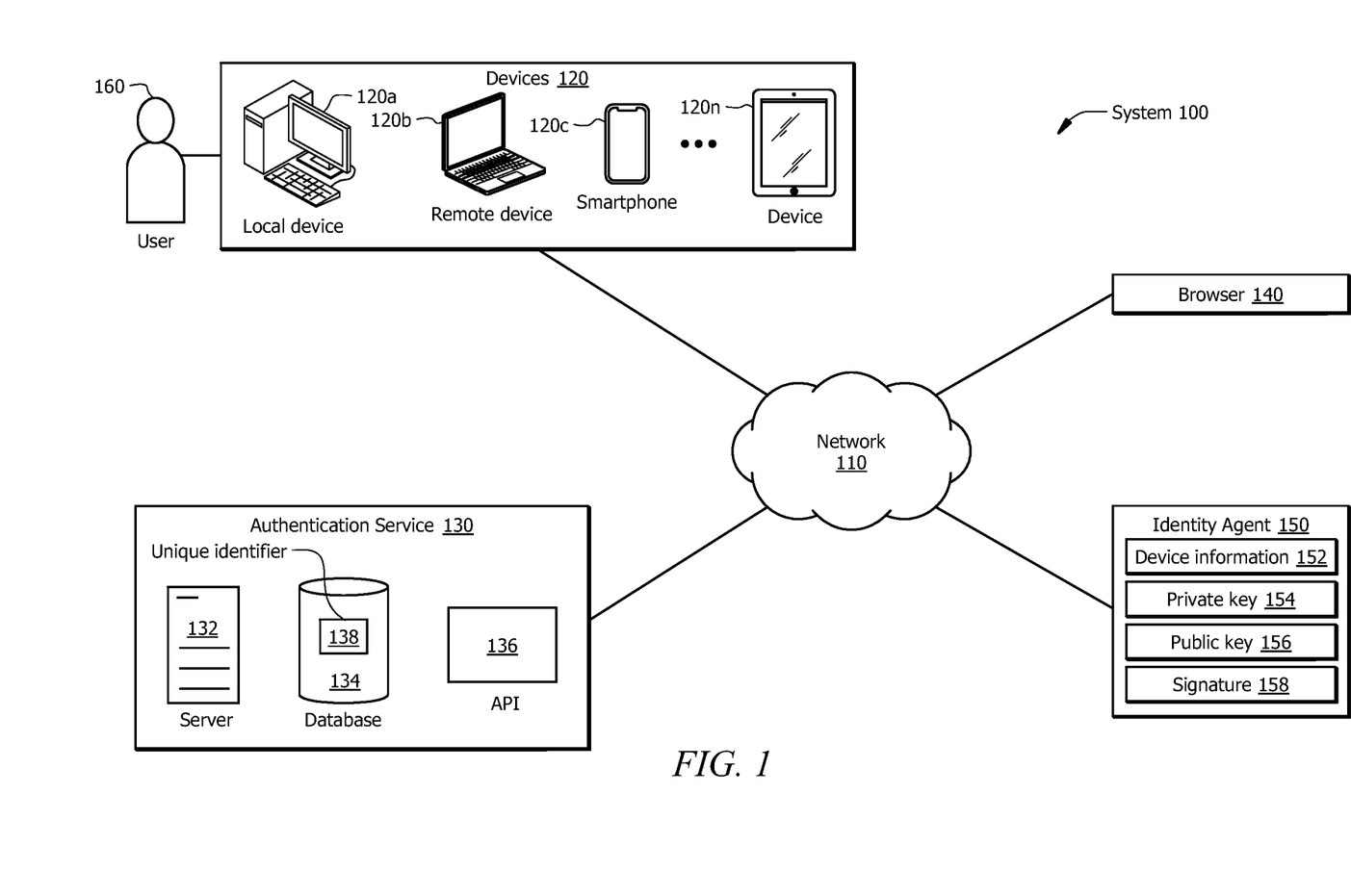
FIG. 1 illustrates an example system for using signed device information to authenticate a user.

FIG. 1 illustrates an example system 100 for using signed device information to authenticate a user. System 100 or portions thereof may be associated with an entity, which may include any entity, such as a business, company, or enterprise, that uses an identity agent to authenticate a user. In certain embodiments, the entity may be a service provider that provides authentication and/or security services. The components of system 100 may include any suitable combination of hardware, firmware, and software. For example, the components of system 100 may use one or more elements of the computer system of FIG. 5. In the illustrated embodiment of FIG. 1, system 100 includes a network 110, devices 120, an authentication service 130, a browser 140, an identity agent 150, and a user 160.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more devices 120.

Devices 120 of system 100 include any user equipment that can receive, create, process, store, and/or communicate information. Devices 120 may include one or more workstations, desktop computers, laptop computers, mobile phones (e.g., smartphones), tablets, personal digital assistants (PDAs), wearable devices, and the like. In certain embodiments, one or more devices 120 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. Devices 120 may be located in any suitable locations to receive and communicate information to user 160 of system 100.

In the illustrated embodiment of FIG. 1, devices 120 include device 120a through device 120n, where n represents any suitable integer. Devices 120 include local device 120a, remote device 120b, and smartphone 120c. Local device 120a is a physical device (e.g., a desktop device, a workstation, etc.) that is not attached at some other point on network 110 as a remote device. In certain embodiments, local device 120a may be located on the premises of an employer of user 160. Remote device 120b is a device with remote access. In some embodiments, remote device 120b may be located at a residence of user 160. Smartphone 120c is a portable device that combines mobile telephone and computing functions into one unit. User 160 may use one or more devices 120 to communicate with authentication service 130.

Authentication service 130 of system 100 is any service that is used to verify an identity of user 160. In certain embodiments, authentication service 130 is delivered on demand to user 160 (e.g., a customer, a company, etc.). In some embodiments, authentication service 130 is delivered to user 160 via the Internet. Authentication service 130 may include Infrastructure-as-a-Service (IaaS), Platforms-as-a-Service (PaaS), Software-as-a-Service (SaaS), and the like. Authentication service 130 may provide on-demand availability of computer system resources (e.g., data storage and computing power) without direct active management by user 160. In certain embodiments, authentication service 130 is a security platform that provides authentication services (e.g., MFA, two-factor authentication (2FA), etc.), endpoint security, remote access solutions, device health, and the like. Authentication service 130 may integrate with enterprise cloud app providers (e.g., Microsoft Office 365, Google Apps, Box and Salesforce).

In the illustrated embodiment of FIG. 1, authentication service 130 is a cloud service that provides authentication services to user 160 of device 120. Authentication service 130 includes a server 132, a database 134, and an application programming interface (API) 136. Server 132 of authentication service 130 is computer hardware and/or software (e.g., a computer program) that provides authentication services to devices 120, such as sharing data and/or resources with devices 120 and/or performing computation for devices 120. In certain embodiments, server 132 acts as a backend to authentication service 130 by facilitating communication between database 134 and browser 140 of system 100. Database 134 of authentication service 130 is an organized collection of data stored and accessed electronically from a computer system. API 136 of authentication service 130 is a software intermediary that allows computers or applications of authentication service 130 to communicate with one or more devices 120. In certain embodiments, API 136 is a backend mobile API that is used to communicate with smartphone 120c.

Browser 140 of system 100 is a software program that allows user 160 to view web pages on device 120. In certain embodiments, browser 140 is installed on one or more devices 120 of system 100. Browser 140 may include a GUI for displaying and navigating between web pages. In some embodiments, browser 140 retrieves content from a website's web server and displays the content on one or more devices 120. For example, browser 140 may retrieve content from server 132 of authentication service 130 and display the content on device 120a (e.g., a desktop device). Browser 140 may be one of the following types of browsers: Google Chrome, Mozilla Firefox, Edge, Safari, Opera, Konqueror, Lynx, Vivaldi, and the like. In certain embodiments, browser 140 must be supported by authentication service 130. In some embodiments, user 160 of device 120 uses browser 140 installed on device 120 to log into device 120. In certain embodiments, browser 140 communicates with identity agent 150.

Identity agent 150 of system 100 is an application that is installed on device 120 (e.g., device 120a) and dedicated to device 120 on which identity agent 150 is installed. Identity agent 150 may be associated with a listen server. The listen server is a dedicated server that runs on device 120. In certain embodiments, the listen server is hosted by identity agent 150. In some embodiments, identity agent 150 communicates with browser 140 through the listen server (e.g., a Hypertext Transfer Protocol Secure (HTTPS) localhost listen server). In certain embodiments, once browser 140 initiates communication with identity agent 150 (e.g., via the listen server), identity agent 150 launches itself.

In some embodiments, identity agent 150 is an application such as a device health application (DHA) that identifies and/or collects device information 152. Device information 152 is any information associated with device 120 that provides insight into the identity and/or health of device 120. Device information 152 may include a name of device 120, an identification of device 120 (e.g., an IMEI number), a model of device 120 (e.g., an Android or iPhone designation), a carrier of device 120 (e.g., a mobile operator pulled from a subscriber identification module (SIM) card of device 120), anti-malware characteristics, certificate characteristics, an identity of a local user of device 120, a time that device 120 was last updated, a disk encryption status, a device encryption status, an identification of one or more applications (e.g., web browser 140 and/or identity agent 150) installed on device 120, a version of one or more applications (e.g., web browser 140 and/or identity agent 150) installed on device 120, an identification and/or version of an operating system (OS) of device 120, a firewall status of device 120, a presence/identification of one or more hardware-backed keys, one or more hardware device identifications, a membership in a management system (e.g. Active Directory), a status reported by other software on system 100 (e.g. an indication of whether anti-virus software detected any threats), and the like.

Identity agent 150 may collect device information 152 according to one or more selections. For example, an administrator of system 100 may instruct identity agent 150 to collect device information 152 related the identity of device 120 and the status of the OS of device 120. As another example, an administrator of system 100 may instruct identity agent 150 to collect device information 152 related to the identity of device 120 and the latest versions of certain applications (e.g., browser 140 and identity agent 150) installed on device 120. In certain embodiments, device information 120 may change over time depending on the availability of device information 120. Identity agent 150 may identify and/or collect device information 152 in response to an initial launch of identity agent 150, in response to a request to provide device information 152, at predetermined intervals, etc.

In some embodiments, identity agent 150 generates a private key 154. Private key 154 is a secret key used to encrypt and/or decrypt information between communicators. Identity agent 150 securely stores private key 154 on device 120. In certain embodiments, identity agent 150 generates a public key 156. Public key 156 is a cryptographic key that can be obtained by authentication service 130 and used to decrypt information received from device 120. In certain embodiments, the information encrypted by identity agent 120 can be deciphered only by using public key 156. Together, the private key 154 and public key 156 form a public/private key pair. The public/private key par is any suitable asymmetric type of key pair. The key pair may be generated using one of the following types of asymmetric encryption: Rivest-Shamir-Adleman (RSA), Digital Signature Standard (DSS), Elliptical Curve Cryptography (ECC), the 5Diffie-Hellman exchange method, Transport Layer Security (TLS)/Secure Sockets Layer (SSL) protocol, and the like.

In certain embodiments, identity agent 150 communicates device information 152 and public key 156 to authentication service 130, which allows authentication service 130 to register device information 152 and public key 156. After registering device information 152 and public key 156, authentication service 130 may generate a unique identifier 138 and communicate unique identifier 138 to identity agent 150. Unique identifier 138 is any value assigned to identity agent 150 that is unique. Unique identifier 138 may identify identity agent 150 with near certainty that unique identifier 138 does not duplicate one that has already been, or will be, created to identify something else such as another identity agent. Unique identifier 138 may be a universally unique identifier (UUID), a 128-bit label, a GUID, a combination thereof, or any other suitable identifier.

In certain embodiments, identity agent 150 electronically signs device information 152 with a signature 158. Signature 158 is a mathematical technique used to validate the authenticity and/or integrity of information such as device information 152. Signature 158 may provide evidence of origin, identity, and/or status of electronic documents, transactions, and/or digital messages. In some embodiments, identity agent 150 uses private key 154 to encrypt device information 152 signed with signature 158. After signing device information 152 with signature 158, identity agent 150 communicates unique identifier 138, device information 152, and signature 158 to browser 140.

User 160 of system 100 is a person or group of persons who utilize one or more devices 120 of system 100. User 160 may be associated with one or more accounts. User 160 may be a local user, a remote user, an administrator, a customer, a company, a combination thereof, and the like. User 160 may be associated with a username, a password, a user profile, etc.

In operation, upon first launch, identity agent 150 installed on device 120 generates private key 154 and public key 156. Identity agent 150 maintains secrecy of private key 154 and registers public key 156 with database 134 (e.g., a backend device store) of authentication service 130. User 160 fully authenticates themselves with authentication service 130 using MFA. Authentication service 130 generates unique identifier 138 and communicates unique identifier 138 to identity agent 150. During login, identity agent 150 communicates with the login prompt of authentication service 130 via a connection established with browser 140 installed on device 120. Identity agent 150 identifies and collects device information 152 and signs device information 152 with signature 158. Identity agent 150 then sends unique identifier 138, device information 152, and signature 158 through the interface to the login prompt, and authentication service 130 creates a record to record the association between device 120 and user 160.

Although FIG. 1 illustrates a particular number of networks 110, devices 120, authentication services 130, servers 132, databases 134, APIs 136, browsers 140, identity agents 150, private keys 154, public keys 156, signatures 158, and users 160, this disclosure contemplates any suitable number of networks 110, devices 120, authentication services 130, servers 132, databases 134, APIs 136, browsers 140, identity agents 150, private keys 154, public keys 156, signatures 158, and users 160. For example, system 100 may include more than one authentication service 130.

Although FIG. 1 illustrates a particular arrangement of network 110, devices 120, authentication service 130, server 132, database 134, API 136, browser 140, identity agent 150, and user 160, this disclosure contemplates any suitable arrangement of network 110, devices 120, authentication service 130, server 132, database 134, API 136, browser 140, identity agent 150, and user 160. Furthermore, although FIG. 1 describes and illustrates particular components, devices, or systems carrying out particular actions, this disclosure contemplates any suitable combination of any suitable components, devices, or systems carrying out any suitable actions.

Figure 2:
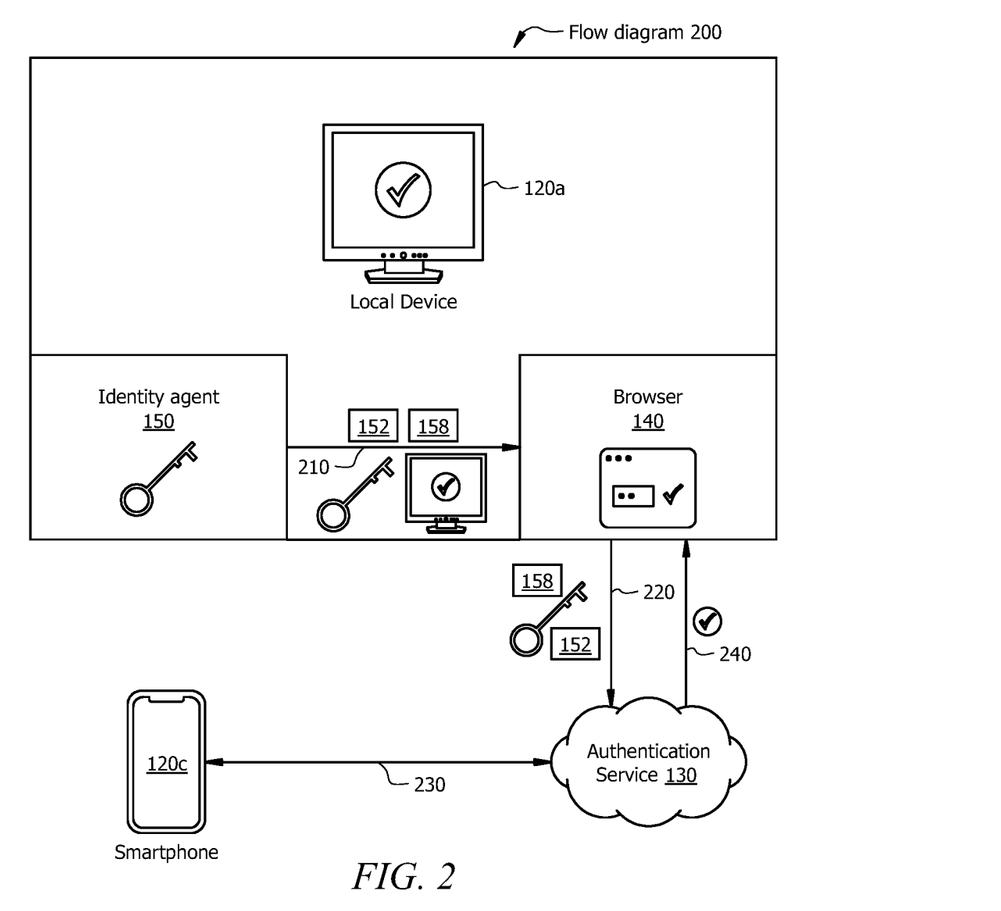
FIG. 2 illustrates an example flow diagram for using signed device information to authenticate a user.

FIG. 2 illustrates an example flow diagram 200 for using signed device information to authenticate a user. Flow diagram 200 of FIG. 2 may be used by system 100 of FIG. 1. The illustrated embodiment of FIG. 2 includes local device 120a, smartphone 120c, authentication service 130, browser 140, and identity agent 150. Local device 120a, smartphone 120c, authentication service 130, browser 140, and identity agent 150 are described above in FIG. 1.

At step 210 of flow diagram 200, identity agent 150 installed on user's local device 120a communicates device information 152 and signature 158 to browser 140 installed on device 120. In certain embodiments, identity agent 150 generates signature 158 by signing device information 152 with a private key (e.g., private key 154 of FIG. 1). At step 220 of flow diagram 200, browser 140 communicates device information 152 and signature 158 to authentication service 130 for verification. Authentication service 130 may verify signature 158 using a public key (e.g., public key 156 of FIG. 1) previously sent to authentication service 130 by identity agent 150. At step 230 of flow diagram 200, if authentication service 130 validates signature 158 and recognizes device information 152, authentication service 130 sends a push to user's smartphone 120c. The push may be answered by smartphone 120c using a biometric (e.g., a face scan, a fingerprint, etc.). At step 240 of flow diagram 200, an authentication decision (e.g., to grant access or to deny access) is communicated back to the authentication prompt in browser 140.

As such, by incorporating access device trust via identity agent 150, push phishing and may be prevented while allowing the user a simple login experience. A user will be able to use their own smartphone 120c for the vast majority of logins without a password. After an initial authentication using MFA, a user can send a notification to their smartphone 120c, approve access via their smartphone 120c, and access their applications. The user can log in from multiple devices (e.g., local device 120a and remote device 120b) using the same smartphone 120c instead of a password.

Although FIG. 2 illustrates a particular number of devices 120, authentication services 130, browsers 140, and identity agents 150, this disclosure contemplates any suitable number of devices 120, authentication services 130, browsers 140, and identity agents 150. Although FIG. 2 illustrates a particular arrangement of local device 120a, smartphone 120c, authentication service 130, browser 140, and identity agent 150, this disclosure contemplates any suitable arrangement of local device 120a, smartphone 120c, authentication service 130, browser 140, and identity agent 150. Furthermore, although FIG. 2 describes and illustrates particular components, devices, or systems carrying out particular actions, this disclosure contemplates any suitable combination of any suitable components, devices, or systems carrying out any suitable actions.

Although this disclosure describes and illustrates particular steps of flow diagram 200 of FIG. 2 as occurring in a particular order, this disclosure contemplates any suitable steps of flow diagram 200 of FIG. 2 occurring in any suitable order. Although this disclosure describes and illustrates an example flow diagram for using signed device information to authenticate a user including the particular steps of the method of FIG. 2, this disclosure contemplates any suitable flow diagram for using signed device information to authenticate a user including any suitable steps, which may include all, some, or none of the steps of the method of FIG. 2, where appropriate.

Figure 3:
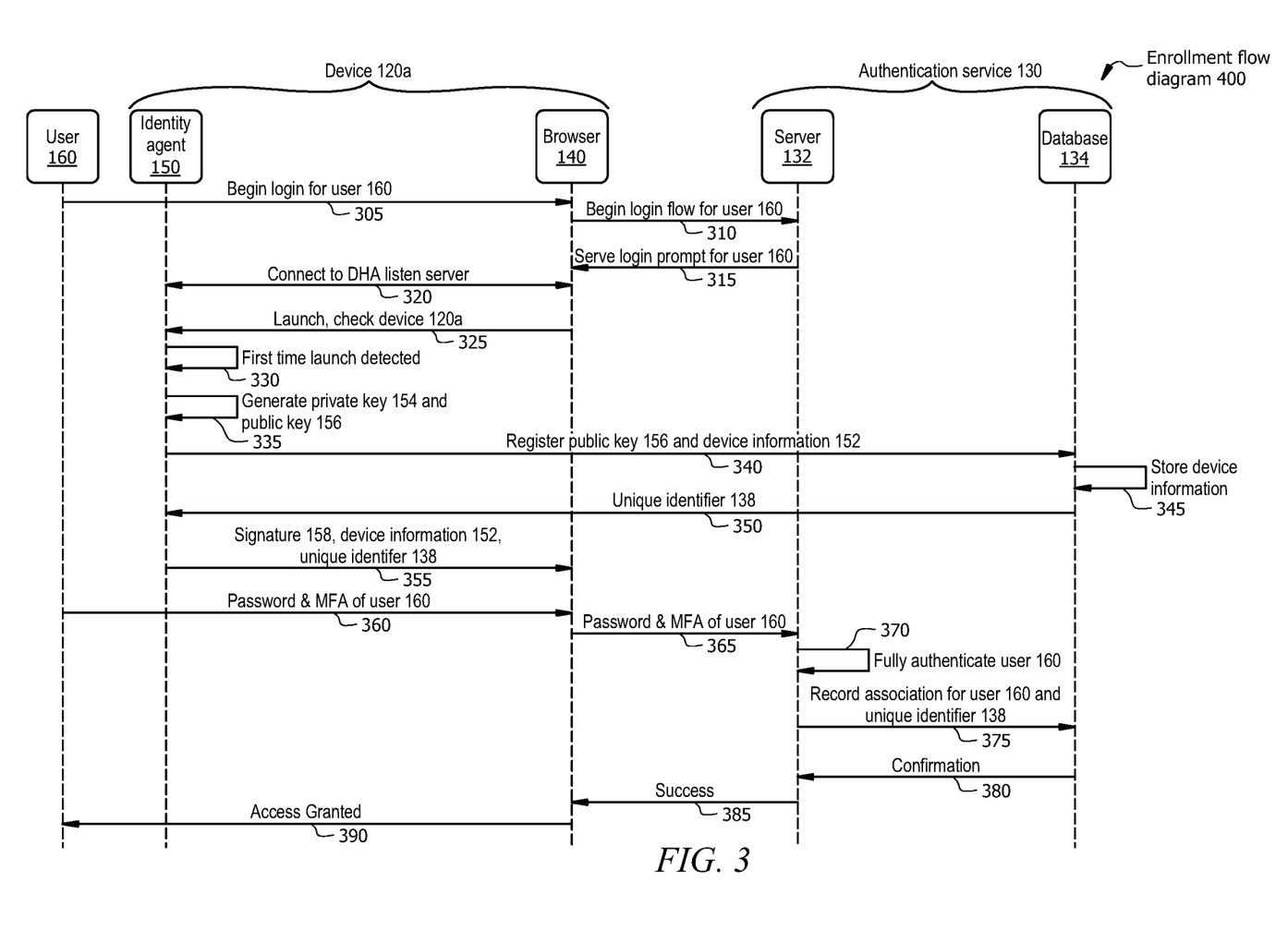
FIG. 3 illustrates an example enrollment flow diagram for using signed device information to authenticate a user.

FIG. 3 illustrates an example enrollment flow diagram 300 for using signed device information to authenticate a user. Flow diagram 300 of FIG. 3 may be used by system 100 of FIG. 1. The illustrated embodiment of FIG. 3 includes local device 120a (e.g., a desktop computer), authentication service 130, server 132, database 134, browser 140, identity agent 150, and user 160. Browser 140 and identity agent 150 are installed on device 120a (e.g., a local desktop computer). Server 132 and database 134 are associated with (e.g., controlled by) authentication service 130. Device 120a, authentication service 130, server 132, database 134, browser 140, identity agent 150, and user 160 are described in more detail in FIG. 1.

At step 305 of flow diagram 300, user 160 begins logging into server 132 of authentication service 130 via browser 140. For example, authentication service 130 may detect that user 160 is attempting to log into an application. At step 310 of flow diagram 300, browser 140 begins the login flow for user 160 by communicating with server 132 of authentication service 130. At step 315 of flow diagram 300, server 132 of authentication service 130 communicates a login prompt to browser 140. At step 320 of flow diagram 300, browser 140 begins communication with identity agent 150 (e.g., a DHA). For example, browser 140 may connect to a listen server (e.g., a DHA listen server) to communicate with identity agent 150.

At step 325 of flow diagram 300, identity agent 150 launches itself. Identity agent 150 checks device 120a and identifies and collects device information 152 from device 120a. Device information 152 may include a device identifier (e.g., an IMEI number), a device model (e.g., an Android designation), a device carrier (e.g., a mobile operator), installed applications, latest versions, certificates, restrictions, and the like. At step 330 of flow diagram 300, identity agent 150 detects that this is the first time identity agent 150 has been launched on device 120a. In response to detecting the initial launch, at step 335 of flow diagram 300, identity agent 150 generates private key 154 and public key 156. Identity agent 154 maintains the secrecy of private key 154. At step 340 of flow diagram 300, identity agent 150 communicates device information 152 and public key 156 to database 134 of authentication service 130. Once received, authentication service 130 registers device information 152 and public key 156.

At step 345 of flow diagram 300, database 134 stores device information 152 and public key 156. At this point in flow diagram 300, identity agent 150 is enrolled in authentication service 130. Authentication service 130 generates unique identifier 138, which uniquely identifies identity agent 150. At step 350 of flow diagram 300, database 134 communicates unique identifier 138 to identity agent 150. Identity agent 150 generates signature 158 by signing device information 152 using private key 154, and at step 355 of flow diagram 300, identity agent 150 communicates unique identifier 138, device information 152, and signature 158 to browser 140.

At step 360, user 160 enters their password and MFA into the login prompt provided by browser 140. At step 365 of flow diagram 300, browser 140 communicates the password and MFA of user 160 to server 132 of authentication service 130. At step 370 of flow diagram 300, upon receiving the password and MFA, server 132 of authentication service 130 associates user 160 with unique identifier 138 and fully authenticates user 160. In certain embodiments, authentication service 130 fully authenticates user 160 using the password and MFA of user 160 prior to communicating unique identifier 138 to identity agent 150.

At step 375 of flow diagram 300, server 132 of communicates the association of user 160 and unique identifier 138 to database 134 of authentication service 130, where database 134 records the association. At step 380 of flow diagram 300, database 134 of authentication service 130 communicates a confirmation to server 132 of authentication service 130 that the association has been stored. At step 385 of flow diagram 300, authentication service 130 communicates the successful authentication of user 160 to browser 140. At step 390 of flow diagram 300, browser 140 grants user 160 access to the application.

Although FIG. 3 illustrates a particular number of devices 120, authentication services 130, servers 132, databases 134, browsers 140, identity agents 150, and users 160, this disclosure contemplates any suitable number of devices 120, authentication services 130, servers 132, databases 134, browsers 140, identity agents 150, and users 160. Although FIG. 3 illustrates a particular arrangement of device 120a, authentication service 130, server 132, database 134, browser 140, identity agent 150, and user 160, this disclosure contemplates any suitable arrangement of device 120a, authentication service 130, server 132, database 134, browser 140, identity agent 150, and user 160. Furthermore, although FIG. 3 describes and illustrates particular components, devices, or systems carrying out particular actions, this disclosure contemplates any suitable combination of any suitable components, devices, or systems carrying out any suitable actions.

Although this disclosure describes and illustrates particular steps of flow diagram 300 of FIG. 3 as occurring in a particular order, this disclosure contemplates any suitable steps of flow diagram 300 of FIG. 3 occurring in any suitable order. For example, steps 360 through 370 of flow diagram 300 may occur prior to step 350 of flow diagram 300. Although this disclosure describes and illustrates an example enrollment flow diagram 300 for using signed device information to authenticate a user including the particular steps of the method of FIG. 3, this disclosure contemplates any suitable enrollment flow diagram for using signed device information to authenticate a user including any suitable steps, which may include all, some, or none of the steps of the method of FIG. 3, where appropriate.

Figure 4:
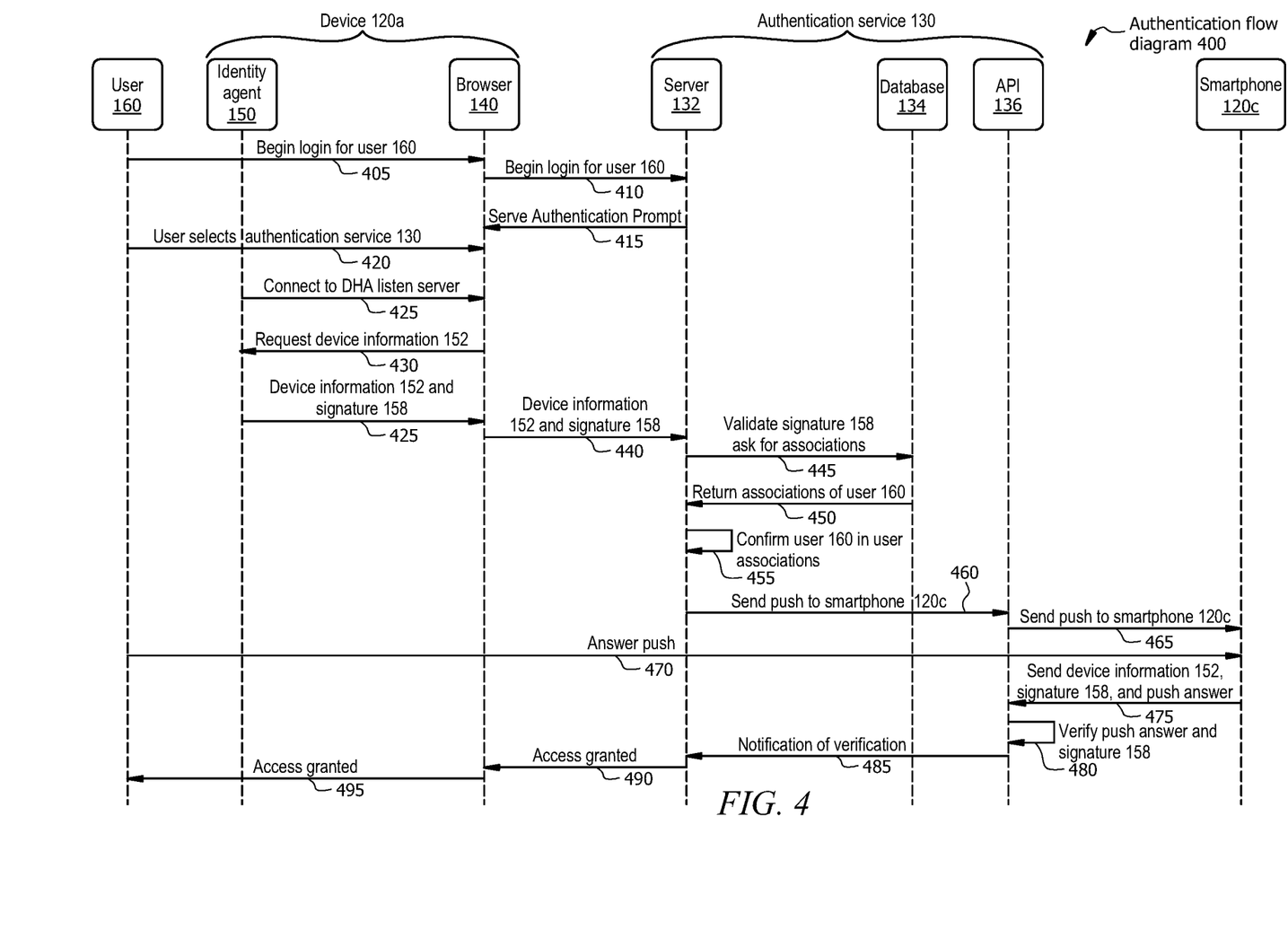
FIG. 4 illustrates an example authentication flow diagram for using signed device information to authenticate a user.

FIG. 4 illustrates an example authentication flow diagram 400 for using signed device information to authenticate a user. Flow diagram 400 of FIG. 4 may be used by system 100 of FIG. 1. The illustrated embodiment of FIG. 4 includes device 120a (e.g., a desktop computer), smartphone 120c, authentication service 130, server 132, database 134, API 136, browser 140, identity agent 150, and user 160. Browser 140 and identity agent 150 are installed on device 120a. Server 132, database 134, and API 136 are associated with (e.g., controlled by) authentication service 130. Device 120a (e.g., a desktop computer), smartphone 120c, authentication service 130, server 132, database 134, API 136, browser 140, identity agent 150, and user 160 are described in more detail in FIG. 1.

At step 405 of flow diagram 400, user 160 begins logging into an application (e.g., an email web application) in browser 140. At step 410 of flow diagram 400, browser 140 begins the login flow for user 160 by communicating with server 132 of authentication service 130. At step 415 of flow diagram 400, server 132 of authentication service 130 communicates an authentication prompt to browser 140. In certain embodiments, the authentication prompt is an interactive, browser-based authentication interface that allows user 160 to select an authentication method. At step 420 of flow diagram 400, user 160 responds to the authentication prompt by selecting mobile authentication (i.e., authentication via a mobile device such as smartphone 120c).

At step 425 of flow diagram 400, browser 140 begins communication with identity agent 150 (e.g., a DHA). For example, browser 140 may connect to a listen server (e.g., a DHA listen server) to communicate with identity agent 150. At step 430 of flow diagram 400, browser 140 requests device information 152 from identity agent 150. At step 435 of flow diagram 400, in response to the request, identity agent 150 communicates device information 152 and signature 158 to browser 140. Device information 152 communicated to browser 140 at step 435 of FIG. 4 may be the same or different than device information 152 communicated to browser 140 at step 355 in FIG. 3, depending on whether device information 152 collected by identity agent 150 has been updated. At step 440 of flow diagram 400, browser 140 communicates device information 152 and signature 158 to server 132 of authentication service 130.

At step 445 of flow diagram 400, server 132 of authentication service 130 determines whether to validate signature 158. For example, server 142 of authentication service 130 may validate signature 158 by using public key 146 to decrypt signature 158 signed with private key 154. If server 132 of authentication service 130 validates signature 158, server 132 communicates a request to database 134 of authentication service 130 for association of user 160 with the unique identifier (e.g., unique identifier 138 of FIG. 1) that uniquely identifies identity agent 150. At step 450 of flow diagram 400, database 134 returns the association of user 160 with the unique identifier. At step 455 of flow diagram 300, server 132 of authentication service 130 confirms the association of user 160 with the unique identifier.

At step 460 of flow diagram 400, after validating signature 158 and confirming the association between user 160 and the unique identifier, server 132 of authentication service 130 sends a push to API 136 of authentication service 130. At step 465 of flow diagram 400, upon receiving the push, API 136 forwards the push to smartphone 120c of user 160. At step 470 of flow diagram 400, user 160 answers the push. For example, user 160 may answer the push with a biometric. At step 475 of flow diagram 300, smartphone 120c communicates device information 152, signature 158, and the push answer to API 136 of authentication service 130. At step 480 of flow diagram 400, API 136 of authentication service 130 verifies the push answer and signature 158. At step 485 of flow diagram 400, API 136 communicates a notification of the verification to server 132. At step 490 of flow diagram 400, server 132 of authentication service 130 grants browser 140 access to the application. At step 495 of flow diagram 400, browser 140 grants user 160 access to the application.

Although FIG. 4 illustrates a particular number of devices 120, authentication services 130, servers 132, databases 134, APIs 136, browsers 140, identity agents 150, and users 160, this disclosure contemplates any suitable number of devices 120, authentication services 130, servers 132, databases 134, APIs 136, browsers 140, identity agents 150, and users 160. Although FIG. 4 illustrates a particular arrangement of device 120a, smartphone 120c, authentication service 130, server 132, database 134, API 136, browser 140, identity agent 150, and users 160, this disclosure contemplates any suitable arrangement of device 120a, smartphone 120c, authentication service 130, server 132, database 134, API 136, browser 140, identity agent 150, and users 160. Furthermore, although FIG. 4 describes and illustrates particular components, devices, or systems carrying out particular actions, this disclosure contemplates any suitable combination of any suitable components, devices, or systems carrying out any suitable actions.

Although this disclosure describes and illustrates particular steps of flow diagram 400 of FIG. 4 as occurring in a particular order, this disclosure contemplates any suitable steps of flow diagram 400 of FIG. 4 occurring in any suitable order. Although this disclosure describes and illustrates an example authentication flow diagram 400 for using signed device information to authenticate a user including the particular steps of the method of FIG. 3, this disclosure contemplates any suitable authentication flow diagram for using signed device information to authenticate a user including any suitable steps, which may include all, some, or none of the steps of the method of FIG. 4, where appropriate.

Figure 5:
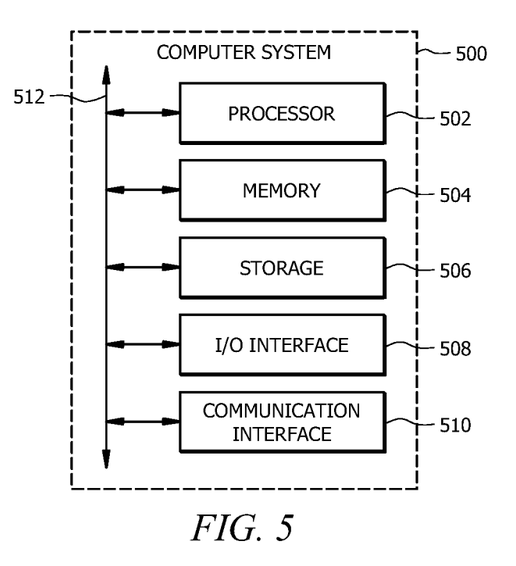
FIG. 5 illustrates an example computer system that may be used by the systems and methods described herein.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 404, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or USB drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 406. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 508 may include one or more device or software drivers enabling processor 502 to drive one or more of these I/O devices. I/O interface 508 may include one or more I/O interfaces 408, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packetbased communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A device comprising one or more processors and one or more computer-readable non-transitory storage media coupled to the one or more processors and including instructions that, when executed by the one or more processors, cause the device to perform operations comprising:
   establishing, by an identity agent installed on a device, a connection to a browser installed on the device;
   generating, by the identity agent, first device information, a public key, and a private key;
   communicating, by the identity agent, the first device information and the public key to an authentication service;
   receiving, by the identity agent, a unique identifier from the authentication service;
   generating, by the identity agent, a first signature of the first device information; and
   communicating, by the identity agent, the first signature, the first device information, and the unique identifier to the browser.

2. The device of claim 1, further comprising:
   receiving, by the identity agent, a request for second device information from the browser;
   generating, by the identity agent, second device information;
   generating, by the identity agent, a second signature of the second device information; and
   communicating, by the identity agent, the second signature and the second device information to the browser;
   wherein the second device information is the same as or different than the first device information.

3. The device of claim 1, wherein the first device information comprises one or more of the following:
   an International Mobile Equipment Identity (IMEI) number of the device;
   a latest version of the identity agent installed on the device;

a latest version of the browser installed on the device;
a latest version of an operating system (OS) installed on the device; and
an identification of firewalls installed on the device.

4. The device of claim 1, wherein the identity agent generates the first signature by signing the first device information with the private key.

5. The device of claim 1, wherein:
the private key and the public key form an asymmetric key pair; and
the identity agent maintains secrecy of the private key.

6. The device of claim 1, wherein:
the unique identifier is a globally unique identifier (GUID); and
the unique identifier uniquely identifies the identity agent.

7. The device of claim 1, wherein the identity agent communicates the first device information and the public key to the authentication service prior to receiving the unique identifier from the authentication service.

8. A method, comprising:
establishing, by an identity agent installed on a device, a connection to a browser installed on the device;
generating, by the identity agent, first device information, a public key, and a private key;
communicating, by the identity agent, the first device information and the public key to an authentication service;
receiving, by the identity agent, a unique identifier from the authentication service;
generating, by the identity agent, a first signature of the first device information; and
communicating, by the identity agent, the first signature, the first device information, and the unique identifier to the browser.

9. The method of claim 8, further comprising:
receiving, by the identity agent, a request for second device information from the browser;
generating, by the identity agent, second device information;
generating, by the identity agent, a second signature of the second device information; and
communicating, by the identity agent, the second signature and the second device information to the browser;
wherein the second device information is the same as or different than the first device information.

10. The method of claim 8, wherein the first device information comprises one or more of the following:
an International Mobile Equipment Identity (IMEI) number of the device;
a latest version of the identity agent installed on the device;
a latest version of the browser installed on the device;
a latest version of an operating system (OS) installed on the device; and
an identification of firewalls installed on the device.

11. The method of claim 8, wherein the identity agent generates the first signature by signing the first device information with the private key.

12. The method of claim 8, wherein:
the private key and the public key form an asymmetric key pair; and
the identity agent maintains secrecy of the private key.

13. The method of claim 8, wherein:
the unique identifier is a globally unique identifier (GUID); and
the unique identifier uniquely identifies the identity agent.

14. The method of claim 8, wherein the identity agent communicates the first device information and the public key to the authentication service prior to receiving the unique identifier from the authentication service.

15. One or more computer-readable non-transitory storage media embodying instructions that, when executed by a processor, cause the processor to perform operations comprising:
establishing, by an identity agent installed on a device, a connection to a browser installed on the device;
generating, by the identity agent, first device information, a public key, and a private key;
communicating, by the identity agent, the first device information and the public key to an authentication service;
receiving, by the identity agent, a unique identifier from the authentication service;
generating, by the identity agent, a first signature of the first device information; and
communicating, by the identity agent, the first signature, the first device information, and the unique identifier to the browser.

16. The one or more computer-readable non-transitory storage media of claim 15, further comprising:
receiving, by the identity agent, a request for second device information from the browser;
generating, by the identity agent, second device information;
generating, by the identity agent, a second signature of the second device information; and
communicating, by the identity agent, the second signature and the second device information to the browser;
wherein the second device information is the same as or different than the first device information.

17. The one or more computer-readable non-transitory storage media of claim 15, wherein the first device information comprises one or more of the following:
an International Mobile Equipment Identity (IMEI) number of the device;
a latest version of the identity agent installed on the device;
a latest version of the browser installed on the device;
a latest version of an operating system (OS) installed on the device; and
an identification of firewalls installed on the device.

18. The one or more computer-readable non-transitory storage media of claim 15, wherein the identity agent generates the first signature by signing the first device information with the private key.

19. The one or more computer-readable non-transitory storage media of claim 15, wherein:
the private key and the public key form an asymmetric key pair; and
the identity agent maintains secrecy of the private key.

20. The one or more computer-readable non-transitory storage media of claim 15, wherein:
the unique identifier is a globally unique identifier (GUID); and
the unique identifier uniquely identifies the identity agent.

* * * * *